US007324522B2

(12) United States Patent
Rosengard et al.

(10) Patent No.: US 7,324,522 B2
(45) Date of Patent: Jan. 29, 2008

(54) ENCAPSULATING PACKETS INTO A FRAME FOR A NETWORK

(75) Inventors: Phillip I. Rosengard, Sterling, VA (US); Marwan M. Krunz, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 900 days.

(21) Appl. No.: 10/666,812

(22) Filed: Sep. 18, 2003

(65) Prior Publication Data

US 2005/0063402 A1 Mar. 24, 2005

(51) Int. Cl.
*H04L 12/56* (2006.01)
*H04L 12/413* (2006.01)

(52) U.S. Cl. ............... 370/395.4; 370/412; 370/445

(58) Field of Classification Search ............ 370/412, 370/445, 447, 473, 474, 395.4
See application file for complete search history.

(56) References Cited

U.S. PATENT DOCUMENTS

| 6,104,700 | A | 8/2000 | Haddock et al. | 370/235 |
|---|---|---|---|---|
| 6,141,327 | A | 10/2000 | Kalkunte et al. | 370/252 |
| 6,252,855 | B1 | 6/2001 | Langley | 370/252 |
| 6,483,846 | B1 | 11/2002 | Huang et al. | 370/445 |
| 6,570,849 | B1 | 5/2003 | Skemer et al. | 370/230.1 |
| 6,732,209 | B1 * | 5/2004 | Cherukuri et al. | 710/240 |
| 7,039,061 | B2 * | 5/2006 | Connor et al. | 370/429 |
| 2002/0087713 | A1 | 7/2002 | Cunningham | 709/235 |
| 2002/0167967 | A1 | 11/2002 | Jammes et al. | 370/468 |
| 2004/0120319 | A1 * | 6/2004 | Asawa et al. | 370/395.4 |

FOREIGN PATENT DOCUMENTS

| EP | 1 303 083 A1 | 4/2003 |
|---|---|---|
| EP | 1 317 110 A1 | 6/2003 |
| WO | 03/103241 A1 | 12/2003 |
| WO | 2004/062203 A1 | 7/2004 |

OTHER PUBLICATIONS

U.S. Appl. No. 10/158,351, filed May 29, 2002, entitled "Method And System For Encapsulating Cells," 37 total pages.
U.S. Appl. No. 10/322,120, filed Dec. 17, 2002, entitled "Method And System For Encapsulating Variable-Size packets," 34 total pages.
J. K. Roussos, et al., "*Congestion control protocols for interconnected LANs supporting voice and data traffic*," Computer Communications, XP 000415044, vol. 17, No. 1, © Jan. 1994 Butterworth-Heinemann Ltd., pp. 25-34.
PCT, Notification of Transmittal of the International Search Report and the Written Opinion of the International Searching Authority, or the Declaration dated Dec. 22, 2004 for International Application No. PCT/US2004/026942, 12 pages.

* cited by examiner

*Primary Examiner*—Chau Nguyen
*Assistant Examiner*—Marcus R Smith
(74) *Attorney, Agent, or Firm*—Baker Botts L.L.P.

(57) ABSTRACT

Encapsulating packets into a frame includes receiving the packets at a station of a number of stations of a network. Each packet is associated with a delay requirement that reflects a deadline corresponding to at least one of the stations. The packets are directed to queues of the station. An available channel of the network is detected. It is determined that one or more packets at a queue are ready to be encapsulated into a frame in accordance with the delay requirements. The one or more packets are encapsulated into the frame for transmission using the available channel.

20 Claims, 5 Drawing Sheets

ENCAPSULATING PACKETS INTO A FRAME FOR A NETWORK

TECHNICAL FIELD OF THE INVENTION

This invention relates generally to the field of data communication and more specifically to encapsulating packets into a frame for a network.

BACKGROUND OF THE INVENTION

According to network protocols, packets at a given layer may be encapsulated into frames at a lower layer in order to transmit the packets from one node to another node of a network. Known techniques provide for encapsulating individual Internet Protocol (IP) packets within individual Ethernet frames. Known techniques also provide for supporting the transmission of real-time traffic over a network. For example, a known technique may use forward error correction (FEC) to provide quality-of-service (QoS) guarantees for real-time traffic. Known techniques, however, typically cannot effectively and efficiently encapsulate packets into frames. For example, known techniques, may suffer from high overhead for small sized packets. Also, known techniques may not be able to provide continuous uniform QoS guarantees for real-time traffic in contention-based Ethernet networks.

SUMMARY OF THE INVENTION

In accordance with the present invention, disadvantages and problems associated with previous techniques for encapsulating packets into frames may be reduced or eliminated.

According to one embodiment of the present invention, encapsulating packets into a frame includes receiving the packets at a station of a number of stations of a network. Each packet is associated with a delay requirement that reflects a deadline corresponding to real-time traffic of at least one of the stations. The packets are directed to queues of the station. An available channel of the network is detected. It is determined that one or more packets at a queue are ready to be encapsulated into a frame in accordance with the delay requirements. The one or more packets are encapsulated into the frame for transmission using the available channel.

Certain embodiments of the invention may provide one or more technical advantages. A technical advantage of one embodiment may be that the number of packets encapsulated into a frame at a queue of a network may be adaptively adjusted according to amount of data in the queue, the delay requirements of packets, and the network conditions. Adaptive encapsulation may minimize bandwidth overhead caused by encapsulation. Adaptive encapsulation may also provide uniform delay guarantees for real-time traffic at all times and in the presence of varying network load. Another technical advantage of one embodiment may be that adaptive encapsulation may provide for a reduced number of transmission attempts, which may lead to improved throughput performance.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 7 of the drawings, like numerals being used for like and corresponding parts of the various drawings.

Figure 1:
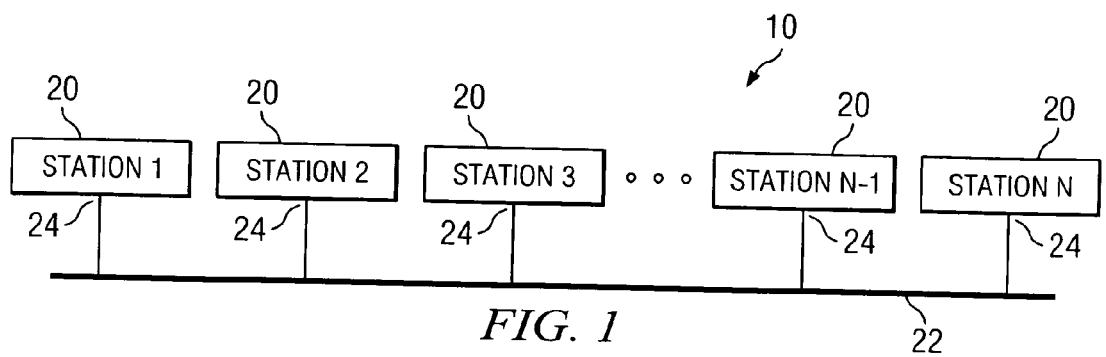
FIG. 1 is a block diagram illustrating one embodiment of a networking system for encapsulating packets into a frame.

FIG. 1 is a block diagram illustrating one embodiment of a system 10 for encapsulating packets into a frame. In general, system 10 manages the number of packets encapsulated into a frame depending upon the delay requirements of the packets and network activity. A larger payload typically yields higher bandwidth efficiency, but also results in longer transmission delays, which may violate the delay requirements of the packets. Accordingly, system 10 attempts to maximize bandwidth efficiency subject to the delay requirements of the packets.

According to the illustrated embodiment, system 10 includes one or more stations 20 coupled to a link 22. A station 20 may comprise an Ethernet station that receives packets from an upper Internet Protocol layer that are destined to other nodes of the network. Station 20 may adaptively encapsulate packets into a frame to attempt to minimize encapsulation overhead subject to the delay requirements of the packets. Station 20 includes an input 24 that receives frames from the network and transmits frames to the network. Link 22 may provide system 10 with one or more channels that may be used to transport packets. A channel of link 22 may have a corresponding activity state. For example, the channel may be idle or available, busy, or in collision. Link 22 may comprise, for example, a cable compatible with Ethernet Protocols.

To aid in the explanation of the embodiment, TABLE 1 summarizes notation used in this document.

TABLE 1

| Parameter | Definition |
| --- | --- |
| N | Number of stations. |
| $F_{rt}$ | Number of real-time (RT) flows at a station. |
| $F_{nrt}$ | Number of non-real-time (NRT) flows at a station. |
| F | Number of flows at a station. |

TABLE 1-continued

| Parameter | Definition |
|---|---|
| $k_i^*$ | Number of packets at the ith queue to be encapsulated into one frame. |
| $B_i^*$ | Size of the first $k_i^*$ packets at the ith queue. |
| D | Random delay of an arbitrary packet. |
| $d_i$ | Deadline associated with packets of the ith real-time flow. |
| $\epsilon_i$ | Upper bound of the fraction of class-i packets with deadlines that are allowed to be violated. The pair ($d_i$, $\epsilon_i$) represents the delay requirement for class-i traffic at a station. |
| $M_{tot}^{(i)}$ | Total number of unique class-i packets that have so far been successfully transmitted or have been discarded at the transmitting station. |
| $M_{vio}^{(i)}$ | Number of class-i packets that have been discarded so far. |
| $\eta(x)$ | Encapsulation efficiency for a frame containing x bytes of payload. |
| $t_{current}$ | Current time at a station. |
| $Q_i$ | Number of packets at the ith queue. |
| $B_i$ | Number of bytes at the ith queue. |
| $t_{arr}(i, j)$ | Arrival time of the jth packet at the ith queue, $j = 1, 2, \ldots, Q_i$. |
| $S_p(i, j)$ | Size (in bytes) of the jth packet at the ith queue. |
| $S_{tot}(i, k)$ | $\sum_{j=1}^{k} s_p(i, j)$. |
| $S_f(i, k)$ | Size (in bytes) of a frame with a payload comprising the first k packets from the ith queue. |
| $R_{link}$ | Transmission capacity in bits per second. |
| T | Worst-case roundtrip propagation delay, used for half-duplex Ethernet. |
| $T_i(k)$ | Delivery time of a frame that contains k packets from the ith queue. |
| I | Inter-frame gap. |
| $\Delta_i(j, k)$ | Total delay of the jth packet transported in a frame that includes k packets from the ith queue. |
| $S_{max}$ | Maximum allowable frame payload. |
| $\Delta_{timer}^{(i)}$ | Timeout value for the frame payload timer (FPT) at the ith queue. |
| $p_1$ | Order (memory length) of the predictor for the packet inter-arrival times. |
| $p_2$ | Order (memory length) of the predictor for the packet sizes. |
| $t_{last}$ | Arrival time of the most recent packet at a given queue. |
| $\hat{t}_{next}$ | Predicted arrival time of the next packet at a given queue. |
| $\hat{s}_{next}$ | Predicted size (in bytes) of the next packet to arrive at a given queue. |
| $\hat{s}_f(i, k + 1)$ | Predicted size of a frame that includes k packets currently available at the ith queue plus one packet that will arrive in the future. |
| $\hat{T}_i(k_i^* + 1)$ | Predicted delivery time of a frame that includes k packets currently at the ith queue plus one packet that will arrive in the future. |
| $\eta_{th}$ | Threshold for the encapsulation efficiency of a frame. |
| $T_{discard}^{(i)}$ | Head-of-line discard timeout value for the ith queue. |

System 10 may be used to communicate packets in a communication network that comprises nodes such as stations and allows the network nodes to communicate with each other. For example, system 10 may be used for a half-duplex or full-duplex Ethernet network. A communication network may also comprise all or a portion of a public switched telephone network (PSTN), a public or private data network, the Internet, a local, regional, or global communication network, an enterprise intranet, other suitable communication link, or any combination of the preceding.

System 10 may encapsulate suitable packets into a suitable frame. A packet may comprise a bundle of data organized in a specific way for transmission, and a frame may comprise the payload of one or more packets organized in a specific way for transmission. According to one embodiment, a packet may comprise all or a portion of an Internet Protocol packet, and a frame may comprise an Ethernet media access control (MAC) frame substantially compatible with the IEEE 802.3 standard.

System 10 may support both real-time (RT) and non-real-time (NRT) traffic. Real-time packets comprise delay-sensitive packet flows carrying, for example, voice or video information, and may have delay requirements. A delay requirement may comprise a deadline calculated according a time by which a packet needs to be delivered to a receiver. According to one embodiment, a delay requirement may be expressed probabilistically according to Equation (1):

$$\Pr[D > d_i] \leq \epsilon_i \tag{1}$$

where D is the random delay of an arbitrary packet, $d_i$ is the deadline associated with packets of the ith real-time flow, and $\epsilon_i$ is a small positive number. The pair ($d_i$, $\epsilon_i$) represents the delay requirement for the ith real-time flow.

The probabilistic guarantee of the delay requirement of Equation (1) may be expressed by Equation (2):

$$M_{vio}^{(i)} / M_{tot}^{(i)} \leq \varepsilon_i \tag{2}$$

where $$M_{tot}^{(i)}$$

is the total number of unique packets from the ith flow that have so far been successfully transmitted or have been discarded at the transmitting station, and $$M_{vio}^{(i)}$$

is the number of packets that have been discarded due to violation of deadlines. Equation (2) maps a probabilistic delay guarantee for an arbitrary packet into a deterministic guarantee for $100(1-\epsilon_i)$ percent of the packets at no more than $100\epsilon_i$ percent packet loss rate.

According to one embodiment, values $$M_{vio}^{(i)} \text{ and } M_{tot}^{(i)}$$

may be expressed in bytes instead of packets. According to one embodiment, counters may be used to keep track of values $M_{vio}^{(i)}$ and $M_{tot}^{(i)}$.

The counters may be reset at any suitable event, for example, when system 10 is powered up, when a session is terminated such as when a queue is empty for more than a specific time period, or other suitable events.

In order to satisfy the delay requirements, system 10 takes into account the delay experienced by a packet transported over the network. The determination of the delay involves calculating the arrival time. Arrival time $t_{arr}(i,j)$, $i=1,2,\ldots,F_{rt}$ and $j=1,2,\ldots,Q_i$, represents the arrival time of the jth packet at the ith queue, where $t_{arr}(i,j)<t_{arr}(i,j+1)$ for all i and j. The size $s_p(i,j)$ represents the size of the packet. Multiple fragments of the same packet may be treated as separate packets with the same arrival time. According to one embodiment, packet re-ordering at queue i is not permitted.

Any suitable procedure may be used to predict the arrival time of the next packet. According to one embodiment, an autoregressive (AR) predictor may be used with time-varying coefficients. The orders $p_1$ and $p_2$ of the autoregressive processes characterize the inter-packet times and packet sizes, respectively ($p_1>1$ and $p_2\geq 1$). Parameters $p_1$ and $p_2$ reflect the memory of the predictor (the time dependence on past data). The value of each parameter may be determined using statistical analysis of the sample autocorrelations and partial autocorrelations of empirical data sequences.

The next inter-packet time at a given queue may be predicted. Variables $y_n$: $n=1,2,\ldots$ represent the sequence of inter-packet times at the input to the queue. An AR($p_1$) characterization of this sequence is given by Equation (3):

$$y_n = \hat{a}_0 + \hat{a}_1 y_{n-1} + \hat{a}_2 y_{n-2} + \ldots + \hat{a}_{p1}(n-1) y_{n-p1} + \Psi_n \quad (3)$$

where $\Psi_n$: $n=1,2,\ldots$ is white noise and $\hat{a}_0, a_1, \ldots, a_{p1}$ are time-varying coefficients. The values of these coefficients are updated following each packet arrival using, for example, weighted recursive least-square estimation methods.

Coefficients $\hat{a}_0(n-1), \hat{a}_1(n-1), \ldots, \hat{a}_{p1}(n-1)$ represent the updated values of the AR coefficients following the availability of the value of $y_{n-1}$. Given these values and the values of $y_{n-1}, \ldots, y_{n-p1}$, a predicted value $\hat{y}_n$ of $y_n$ may be given by Equation (4):

$$\hat{y}_n = \hat{a}_0(n-1) + \hat{a}_1(n-1) y_{n-1} + \hat{a}_2(n-1) y_{n-2} + \ldots + \hat{a}_{p1}(n-1) y_{n-p1} \quad (4)$$

Time $t_{last}$ represents the time of arrival of the most recent packet, $\hat{t}_{next}$ represents the predicted arrival time of the next packet, and $\hat{s}_{next}$ represents the predicted size of the next packet. The value of $\hat{t}_{next}$ is given by the sum of $t_{last}$ and the predicted inter-arrival time. Both $\hat{t}_{next}$ and $\hat{s}_{next}$ are computed every time a packet arrives at the queue.

Frame size $s_f(i,k)$ represents the size of an Ethernet frame that has a payload comprising the first k packets from the ith queue, where $k \leq Q_i$. If $s_{tot}(i,k) \equiv \sum_{j=1}^{k} s_p(i,j)$, then size $s_f(i,k)$ may be described by Equation (5):

$$s_f(i,k) = \begin{cases} s_{overhead} + s_{tot}(i,k), & \text{if } s_{min} \leq s_{tot}(i,k) \leq s_{max} \\ s_{overhead} + s_{min}, & \text{if } s_{tot}(i,k) < s_{min} \end{cases} \quad (5)$$

where $s_{overhead}$ is the framing overhead, $s_{min}$ is the minimum allowable frame payload, and $s_{max}$ is the maximum allowable frame payload, all of which may be measured in bytes. For example, in the case of a 10 Mbps Ethernet, $s_{overhead}=26$, $s_{min}=46$, and $s_{max}=1500$.

Constant $R_{link}$ represents the link capacity in bits per second, and time $\tau$ represents the worst-case round trip time over the link. Time $T_i(k)$ represents the delivery time of a frame that contains k packets from the ith queue. In the absence of collisions, delivery time $T_i(k)$ may be expressed by Equation (6):

$$T_i(k) \leq 8 s_f(i,k)/R_{link} + \tau/2 + I \quad (6)$$

where I is the inter-frame gap. As a convention, $T_i(0)=0$, because the actual round trip time between two stations may be less than $\tau$.

The total delay $\delta_i(j,k)$ of the jth packet may be expressed by Equation (7):

$$\delta_i(j,k) = t_{current} - t_{arr}(i,j) + T_i(k) \quad (7)$$

where $t_{current}$ refers to the current time. Delays $\delta_i(j,k) > \delta_i(j+1,k)$ for all i, j, and k. That is, for a queue with several packets, the first deadline to expire is that of the head-of-line (HOL) packet. Furthermore, $\delta_i(j,k) < \delta_i(j,k+1)$. Since error detection at the destination is performed on the whole frame before any packet can be delivered to the upper layer, the packets of a frame have the same delivery time $T_i(k)$.

Once a frame is delivered to the destination, the frame may need to be acknowledged. The IEEE 802.3 standard does not require acknowledging successfully transmitted frames, since collisions are detectable and a collision can be implicitly regarded as a negative acknowledgement. This, however, does not protect against noise errors. According to one embodiment, acknowledgement frames may be used. Once the receiver verifies that the cyclic redundancy check code is correct, the receiver sends an acknowledgement frame to the transmitting station. The acknowledgement frame may contend for the channel like any other frame, or the channel may be briefly reserved for the transmission of the acknowledgement frame following the reception of a data frame.

Station 20 may perform adaptive encapsulation in accordance with a calculated encapsulation efficiency. According to one embodiment, encapsulation efficiency $\eta(x)$ for a frame that includes x bytes of payload may be expressed as $\eta(x)=x/(\text{total frame size})$. According to one embodiment, for a ten Megabits per second Ethernet network, the minimum allowable frame size is 72 byes, which includes 26 bytes of framing overhead. Accordingly, if $46 \leq x \leq 1500$, no padding bytes are required. Therefore, encapsulation efficiency $\eta(x)=x/(x+26)$.

On the other hand, if $0 \leq x \leq 46$, then padding is needed to insure that the frame size is 72 bytes. In this case, $\eta(n)=x/72$. Accordingly, the encapsulation efficiency $\eta(x)$ may be expressed by Equation (8):

$$\eta(x) = \begin{cases} x/(s_{overhead} + s_{min}), & \text{if } 0 \leq x < s_{overhead} \\ x/(x + s_{min}), & \text{if } s_{overhead} \leq x \leq s_{max} \end{cases} \quad (8)$$

In order for CSMA/CD protocols to work properly, the transmission time of a frame cannot be less than the worst-case roundtrip time (RTT) over the Ethernet so a station can detect a collision before the end of its frame transmission. If the maximum wire distance between two stations remains the same, then the worst-case RTT may also be fixed. Thus, if the transmission speed of the Ethernet is to be increased, then the minimum allowable frame size must also increase to ensure that collisions can be detected. For example, increasing the transmission speed of a 10 Mbps Ethernet ten times while keeping its range fixed requires increasing the minimum frame size by an order of ten.

This, however, may lead to inefficient bandwidth utilization in the case of small frames. Alternatives may include reducing the maximum allowable cable distance between two stations or relying on hubs to interconnect stations. For example, 100 Mbps Ethernet has maintained the minimum frame size at 64 bytes, but relies on hubs with a maximum station-to-hub distance of 100 meters.

Half-duplex Gigabit Ethernet utilizes a carrier extension whereby the transmission of a relatively small frame is followed by the transmission of carrier signals that insure a minimum channel busy time that is equal to the time needed to transmit a full frame. Accordingly, the encapsulation efficiency $\eta_{GIGA}(x)$ may be expressed by Equation (9):

$$\eta_{giga}(x) = \begin{cases} x/s_{minGb}, & \text{if } 0 \leq x < s_{minGb} - s_{min} \\ x/(x+s_{min}), & \text{if } s_{minGb} - s_{min} \leq x \leq s_{max} \end{cases} \quad (9)$$

where $s_{minGb}$ is the minimum allowable frame payload for Gigabit Ethernet.

Modifications, additions, or omissions may be made to system 10 without departing from the scope of the invention. For example, system 10 may have more, fewer, or other modules. Moreover, the operations of system 10 may be performed by more, fewer, or other modules. Additionally, functions may be performed using any suitable logic comprising software, hardware, other logic, or any suitable combination of the preceding. As used in this document, "each" refers to each member of a set or each member of a subset of a set.

Figure 2:
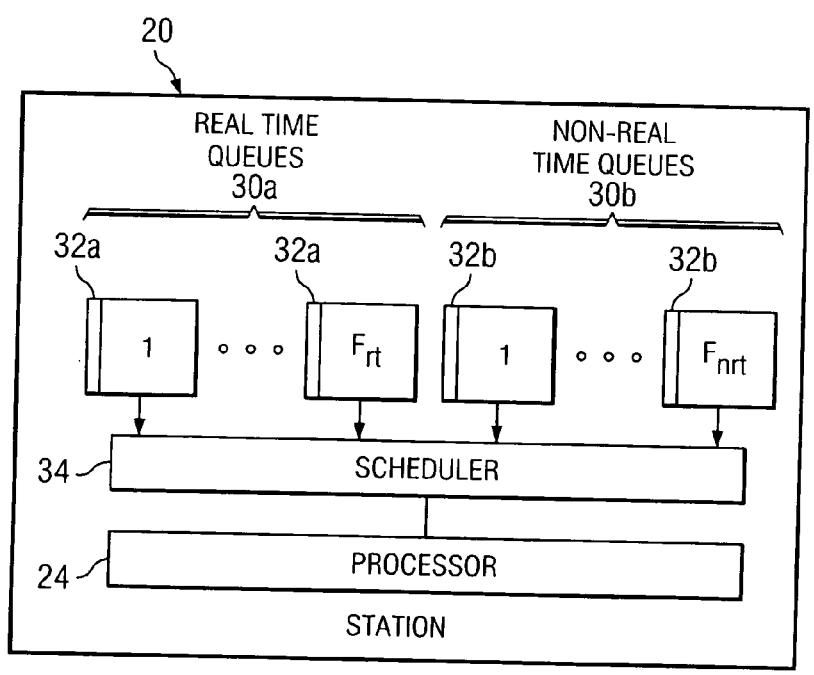
FIG. 2 is a block diagram of one embodiment of a station of the system of FIG. 1.

FIG. 2 is a block diagram of one embodiment of a station 20 of system 10 of FIG. 1. Station 20 may include one or more real-time queues 30a, one or more non-real-time queues 30b, a processor 24, and a scheduler 34 coupled as illustrated in FIG. 2. According to the illustrated embodiment, station 20 includes a number $F_{RT}$ of real-time queues 30a and a number $F_{NRT}$ non-real-time queues 30b. A real-time queue 30a receives a real-time packet flow, and a non-real-time queue 30b receives a non-real-time packet flow. According to one embodiment, different real-time flows may have different delay requirements, and packets that belong to the same real-time flow may have the same delay requirement.

A queue 30a-b may comprise any suitable buffer operable to receive, store, and send packets. Each queue 30a-b may include control logic 32a-b, that manages the operation of the queue 30a-b, and may comprise any suitable device operable to accept input, process the input according to predefined rules, and produce output. Control logic 32a-b may, for example, determine the number of packets that may be encapsulated to form a frame of a suitable size or calculate whether waiting for a next packet would lead to a violation of a delay requirement.

Control logic 32a-b may maintain the number $k_i^*$ of packets, starting from the current head of line packet, to be encapsulated into a frame. The number $k_i^*$ of packets may be updated in response to events such as the arrival of a new packet, the successful delivery of a frame, the expiration of packet delay requirements, other event, or any other combination of the preceding. If a queue i is selected to transmit, queue i either uses an updated value of $k_i^*$ to determine the packets to be encapsulated into a frame or defers transmission until a next round.

A frame payload timer FPT may be associated with the most recently computed $k_i^*$ value. Whenever a new value of $k_i^*$ is computed, the timer may be set according to Equation (10):

$$\Delta_{timer}^{(i)} = [d_i - t_{current} - t_{arr}(i, 1) + T_i(k_i^*)] \quad (10)$$

The timer is set according to the additional queue delay from the time of computation that can be tolerated before the expiration of the deadline of the first packet, that is, the head-of-line packet, of a frame of $k_i^*$ packets. Since the newly computed $k_i^*$ value satisfies $\delta_i(1, k_i^*) \leq d_i$, then $$\Delta_{timer}^{(i)} \geq 0.$$

The frame payload timer FPT may expire before the ith queue transmits a frame. This could happen, for example, if the channel is busy for an extended period of time or if station 20 is in a back-off period. If the frame payload timer FPT expires, then a new value for $k_i^*$ has to be found. The value of $k_i^*$ is decreased until $\delta_i(1, k_i^*) \leq d_i$. If in the process of decreasing $k_i^*$, $k_i^*=0$ is reached, then the deadline of the head-of-line packet cannot be met, that is, $\delta_i(1,1)>d_i$. In that case, station 20 discards the head-of-line packet, increments $$M_{vio}^{(i)},$$

advances the ith queue, and re-computes the values of $k_i^*$ and $$\Delta_{timer}^{(i)}.$$

To discard a head-of-line packet, a timer may track a discard time $$T_{discard}^{(i)}.$$

When a packet advances to the head-of-line position, the timer value may be set according to Equation (11):

$$T_{discard}^{(i)} = d_i - [t - t_{arr}(1, i) + T_i(1) + W_i(t)] \quad (11)$$

Discard time $T_i(1)$ is the minimum possible time that is needed to deliver the head-of-line packet. The timeout value according to Equation (11) is the additional queuing time that can be further tolerated before it becomes unlikely that the head-of-line packet can be delivered in time. If at the time of setting the timeout value, discard time $$T_{discard}^{(i)} < 0,$$

then the head-of-line packet is discarded and the queue is advanced.

The process of computing the timeout value is repeated for the new head-of-line packet by setting the value of $t_{arr}(i,j)$ and the value of $t_{arr}(i,j+1)$ for all j, and using an updated t value. If a head-of-line packet results in $$T^{(i)}_{discard} \geq 0,$$

packet discarding ceases.

Scheduler 34 may be used to determine the service order among the queues 30a-b of a station 20. Scheduler 34 may select queues 30a-b according to any suitable procedure. As an example, scheduler 34 may select queues 30a-b according to a round-robin scheduling procedure, where queues 30a-b are ordered. As another example, scheduler 34 may select queues 30a-b according to a modified round-robin scheduling procedure. Scheduler 34 tracks the last queue 30a-b from which a frame was successfully transmitted. Once a channel becomes available, scheduler 34 selects the next backlogged queue 30a-b to transmit a frame. Scheduler 34 may give equal priority to real-time queues 30a and non-real-time queues 30b or may give priority to real-time queues 30a or to non-real-time queues 30b.

If there is a collision at a channel, scheduler 34 may use a back-off procedure as defined in the IEEE 802.3 standard. After the back-off period, scheduler 34 determines if the channel is idle. If the channel is idle, scheduler 34 waits for an inter-frame gap, and then proceeds to transmit a frame from the queue 30a-b that sent the colliding frame.

Modifications, additions, or omissions may be made to station 20 without departing from the scope of the invention. For example, station 20 may have more, fewer, or other modules. Moreover, the operations of station 20 may be performed by more, fewer, or other modules. For example, the operations of processor 24 and scheduler 34 may be performed by one module, or the operations of scheduler 34 may be performed by more than one module. Additionally, functions may be performed using any suitable logic comprising software, hardware, other logic, or any suitable combination of the preceding.

Figure 3:
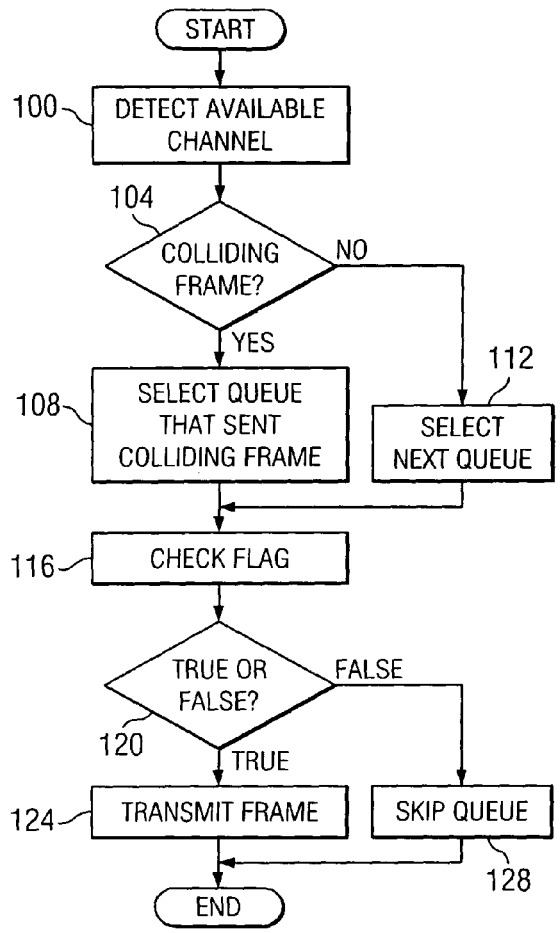
FIG. 3 is a flowchart illustrating one embodiment of a method for encapsulating packets into a frame.

FIG. 3 is a flowchart illustrating one embodiment of a method for encapsulating packets into a frame. The method begins at step 100, where station 20 detects an available channel. Station 20 determines whether a queue 30a-b has sent a colliding frame at step 104. If a queue 30a-b has sent a colliding frame, the method proceeds to step 108, where scheduler 34 selects the queue 30a-b that sent the colliding frame.

If no queue 30a-b has sent a colliding frame, the method proceeds to step 112, where scheduler 34 selects a next queue 30a-b. Next queue 30a-b may be selected according to any suitable selection procedure that may be used to select a queue 30a-b. For example, next queue 30a-b may be selected from the next backlogged queue 30a-b or the next queue 30a-b for which the flag is set to true according to a round-robin procedure. After selecting a queue 30a-b, the method proceeds to step 116.

At step 116, scheduler 34 checks a flag of the selected queue 30a-b that indicates whether there is a frame ready to be transmitted from queue 30a-b. The flag is set in response to any suitable event, such as receiving a packet at the queue, successfully transmitting a frame from the queue 30a-b, other suitable event, or any combination of the preceding.

The flag may be set to true or false at step 120, where true indicates that there is a frame ready for transmission and false indicates that there is no frame ready for transmission. If the flag is set to true, the method proceeds to step 124 where the frame is transmitted. After transmitting the frame the method terminates. If the flag is set to false, the method proceeds to step 128, where queue 30a-b is skipped. After skipping the queue, the method terminates.

Modifications, additions, or omissions may be made to the method without departing from the scope of the invention. Additionally, steps may be performed in any suitable order without departing from the scope of the invention.

Figure 4:
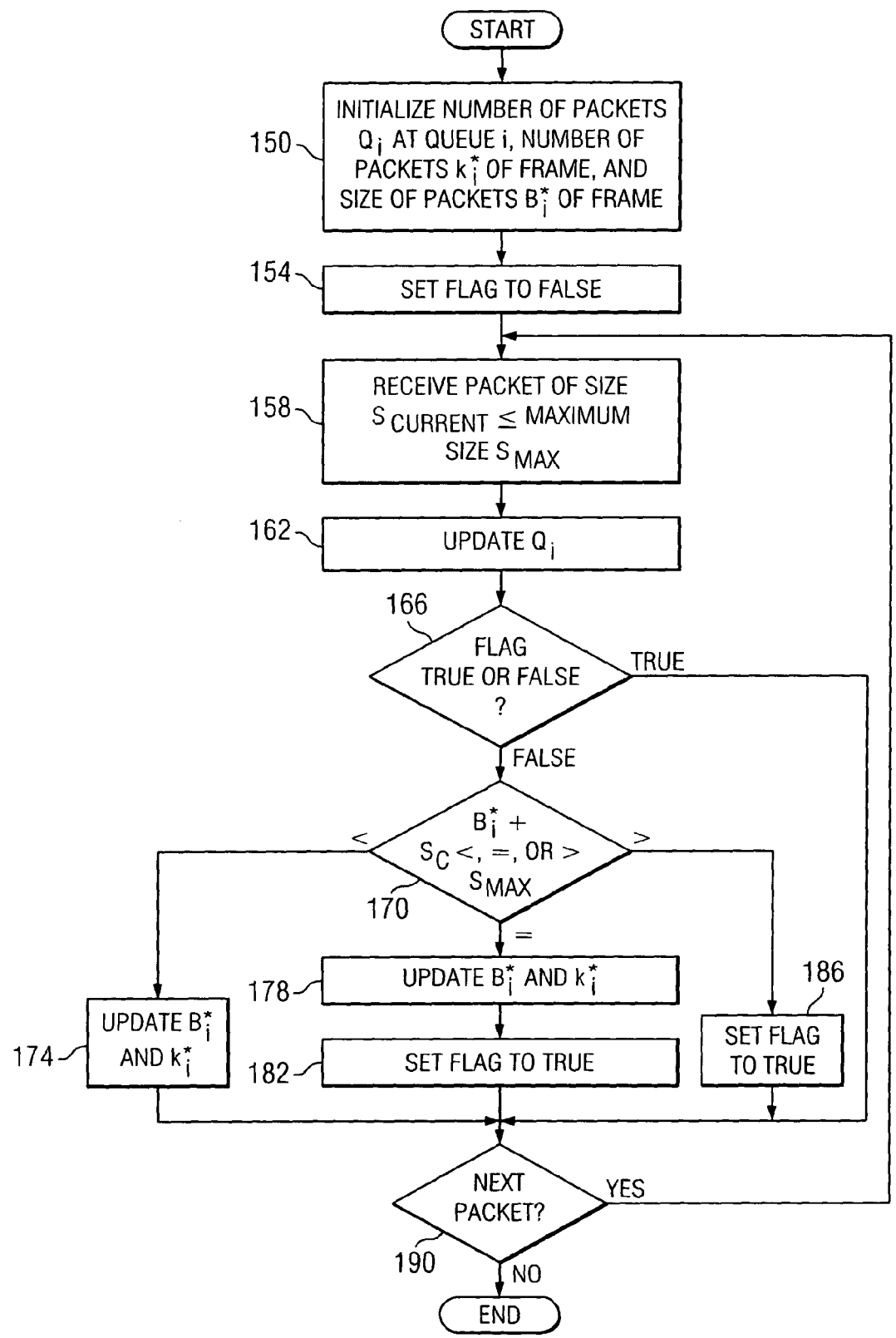
FIG. 4 is a flowchart illustrating one embodiment of a method for updating a flag at a non-real-time queue in response to receiving a packet.

FIG. 4 is a flowchart illustrating one embodiment of a method for updating a flag at non-real-time queue i in response to receiving a packet. The method begins at step 150, where control logic 32a initializes the number $Q_i$ of packets at queue i, the number $k_i^*$ of packets that may be encapsulated into a frame, and the size $B_i^*$ of packets that may be encapsulated into a frame. The size $B_i^*$ of packets corresponds to the collective packet size of the $k_i^*$ packets that may be potentially encapsulated into a frame. A flag is set to false at step 154. A packet having a current packet size $s_{current}$ less than a maximum size $s_{max}$ is received at step 158. Maximum size $s_{max}$ is the maximum allowable frame payload. The values of the number $Q_i$ of packets of queue i is updated at step 162.

The flag may be set to true or false at step 166. If the flag is set to true, the number $k_i^*$ of packets of the frame and the size $B_i^*$ of the packets of the frame do not need to be updated because queue i has packets of a sufficient size to fill the payload of a frame. Accordingly, if a flag is set to true at step 166, the method proceeds to step 190.

If the flag is set to false at step 166, the method proceeds to step 170. Control logic 32a determines at step 170 if the sum of the size $B_i^*$ of the packets plus the size $s_{current}$ of the current packet is less than, equal to, or greater than the maximum size $s_{max}$. If the sum is less than the maximum size $s_{max}$, the method proceeds to step 174, where values for the size $B_i^*$ of packets and the number $k_i^*$ of packets updated. After updating the values, the method proceeds to step 190.

If the sum is equal to the maximum size $s_{max}$, the method proceeds to step 178, where the size $B_i^*$ of packets and the number $k_i^*$ of packets are updated. The flag is set to true at step 182. After setting the flag, the method proceeds to step 190. If the sum is greater than the maximum size $s_{max}$, then the method proceeds to step 186, where the flag is set to true. After setting the flag, the method proceeds to step 190.

Scheduler 34 determines whether there is a next packet at step 190. If there is a next packet, the method returns to step 158, where the next packet is received. If there is no next packet at step 190, the method terminates.

Modifications, additions, or omissions may be made to the method without departing from the scope of the invention. Additionally, steps may be performed in any suitable order without departing from the scope of the invention.

Figure 5:
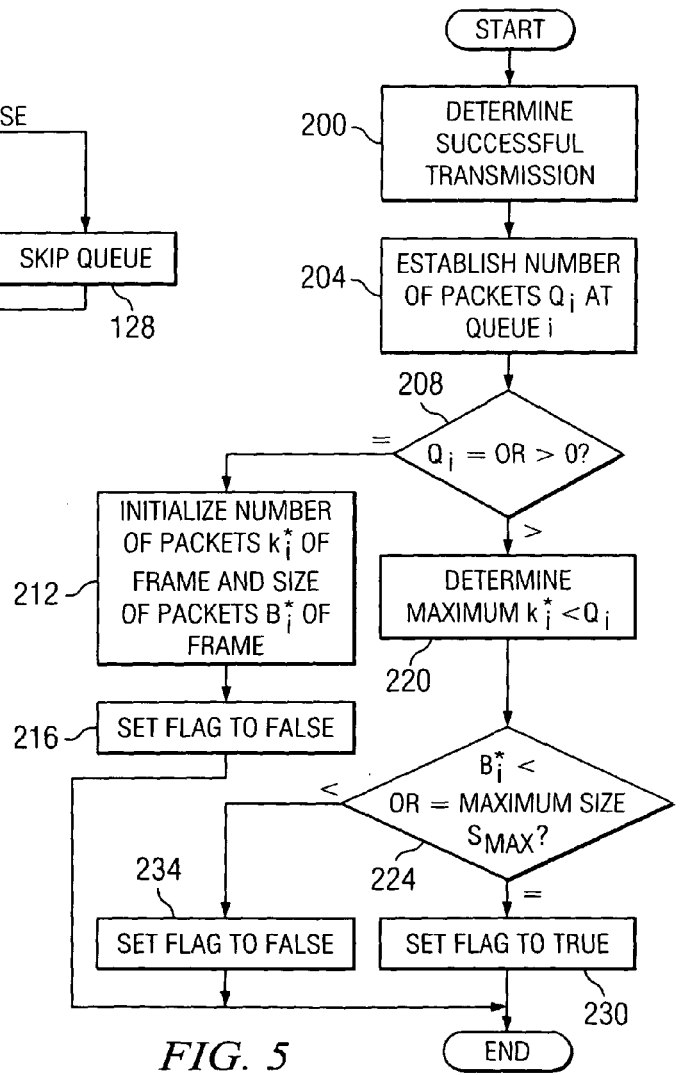
FIG. 5 is a flowchart illustrating one embodiment of a method for updating a flag of a non-real-time queue in response to successful transmission of a frame.

FIG. 5 is a flowchart illustrating one embodiment of a method for updating a flag of non-real-time queue i in response to successful transmission of a frame. The method begins at step 200, where scheduler 34 determines that a frame has been successfully transmitted from queue i. The number $Q_i$ of packets at queue i is established at step 204. The number $Q_i$ of packets may be equal to or greater than zero at step 208. If the number $Q_i$ of packets is equal to zero at step 208, the method proceeds to step 212, where the number $k_i^*$ of packets to be encapsulated into a frame and the size $B_i^*$ of packets to be encapsulated into the frame are initialized. The flag is set to false at step 216. After setting the flag, the method terminates.

If the number $Q_i$ of packets is greater than zero at step 208, the method proceeds to step 220. Processor 24 determines the maximum value of the number $k_i^*$ of packets less than or equal to the total number $Q_i$ of packets at queue i for which the corresponding size $B_i^*$ is less than or equal to maximum $s_{max}$. If size $B_i^*$ is equal to maximum size $s_{max}$ at step 224, the method proceeds to step 230 where the flag is set to true. After setting the flag to true, the method terminates. If size $B_i^*$ is less than maximum size $s_{max}$, the method proceeds to step 234 where the flag is set to false. After setting the flag to false, the method terminates.

Modifications, additions, or omissions may be made to the method without departing from the scope of the invention. Additionally, steps may be performed in any suitable order without departing from the scope of the invention.

Figure 6:
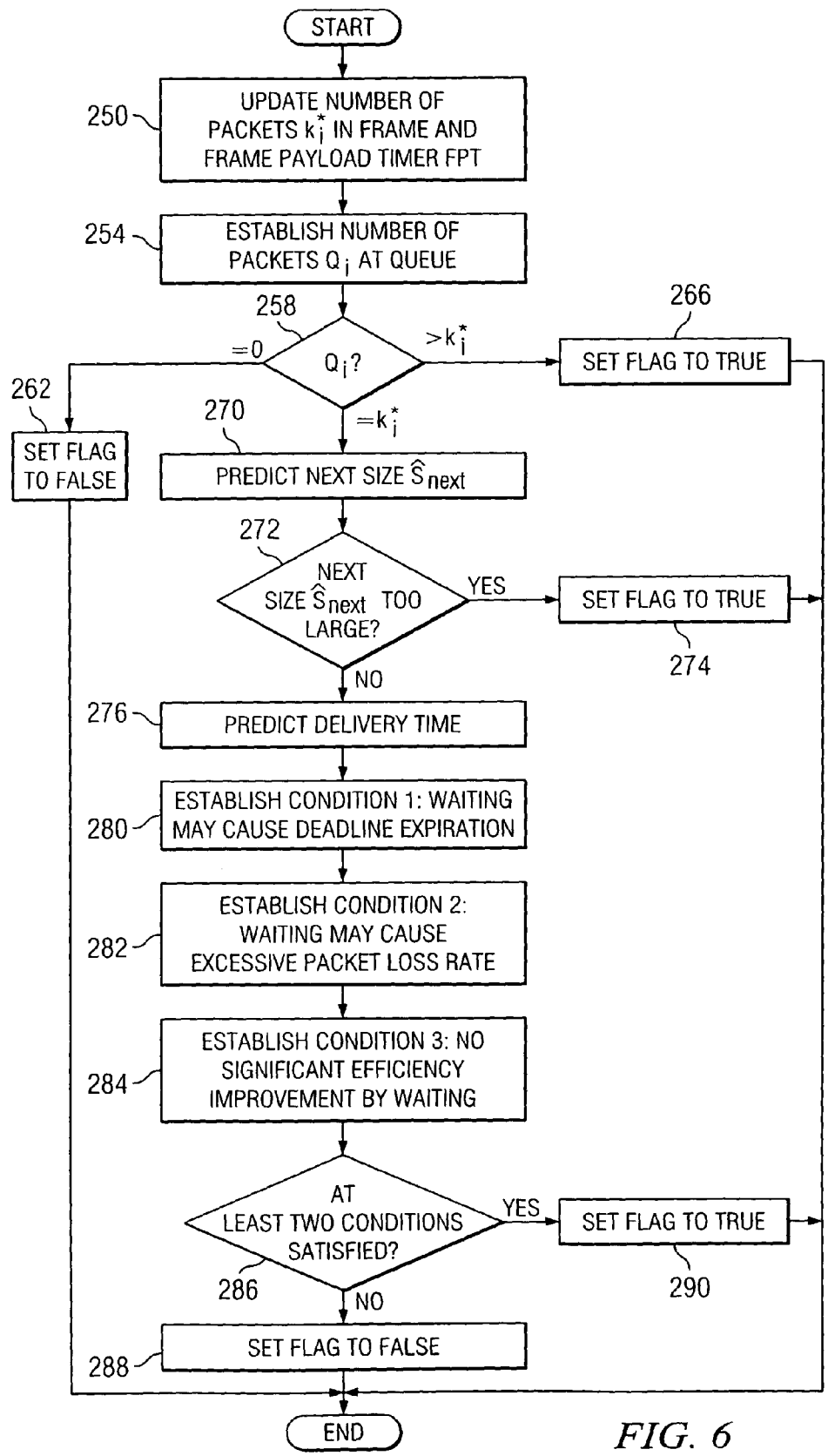
FIG. 6 is a flowchart illustrating one embodiment of a method for setting a flag for a real-time queue.

FIG. 6 is a flowchart illustrating one embodiment of a method for setting a flag for a real-time queue 30a. The method begins at step 250, where the number $k_i^*$ of packets to be encapsulated into a frame and a frame payload timer FPT are updated for a queue i. Frame payload timer FPT may be used to track the amount of time that packets stay at queue i in order to account for the delay requirements of the packets at the queue i.

The number $Q_i$ of packets and at queue i is established at step 254. If the number $Q_i$ of packets is equal to zero at step 258, the method proceeds to step 262 where the flag is set to false. After setting the flag, the method terminates. If the number $Q_i$ of packets at queue i is greater than the number $k_i^*$ of packets to be encapsulated into a frame at step 258, the method proceeds to step 266. The flag is set to true at step 266. After setting the flag, the method terminates.

If the number $Q_i$ of packets at queue i is equal to the number $k_i^*$ of packets to be encapsulated into the frame, the method proceeds to step 270. In this case, the available packets can be accommodated in one frame without violating packet deadlines if the frame is transmitted immediately. If, however, encapsulation is postponed until a new packet arrives at queue i, then it is possible that a frame with $k_i^*$ plus one or more packets may be formed and transmitted without violating packet deadlines.

Processor 24 predicts the next size $\hat{s}_{next}$ of the next packet at step 270. Processor 24 determines whether the sum of the sizes of the packets to be encapsulated and of the next packet is too large, that is, greater than the maximum size $s_{max}$ at step 272. If the sum is too large, that is $s_{tot}(i,k_i^*)+\hat{s}_{next}>s_{max}$, then the method proceeds to step 274, where the flag is set to true. After setting the flag, the method terminates.

If the sum is not too large, that is $s_{tot}(i,k_i^*)+\hat{s}_{next}<\text{or}=s_{max}$, then the method proceeds to step 276, where the delivery time of the next frame is predicted. According to one embodiment, the delivery time may be predicted in the following manner. The predicted size $\hat{s}_f(i,k_i^*+1)$ of the frame that has a payload including the current $k_i^*$ packets plus the next packet to arrive may be described by Equation (12):

$$s_f(i, k_i^* + 1) = \begin{cases} s_{overhead} + s_{tot}(i, k_i^*) + \hat{s}_{next}, & \text{if } s_{min} \leq s_{tot}(i, k_i^*) + \hat{s}_{next} \leq s_{max} \\ s_{overhead} + s_{min}, & \text{if } s_{min} > s_{tot}(i, k_i^*) + \hat{s}_{next} \end{cases} \quad (12)$$

The predicted delivery time of the future frame may be given by Equation (13):

$$\hat{T}_i(k^*+1) = 8s_f(i,k_i^*1)/R_{link}+\tau/2+I \quad (13)$$

Three conditions are established at steps 280 through 284. Whether waiting for the next packet causes a deadline expiration for the head-of-line packet is established at step 280. The deadline expiration refers to the expiration of the deadline associated with the head-of-line packet. The condition may be established using Equation (14):

$$\max\left\{t_{current} + \sum_{j\neq 1} T_j(k_i^*), \hat{t}_{next}\right\} - t_{arr}(i, 1) + \hat{T}_i(k_i^* + 1) > d_i \quad (14)$$

where the summation of Equation (13) is taken over queues 30a-b j for which the flag is currently set to true.

The term $$\sum_{j\neq 1} T_j(k_i^*)$$

is a forecast of the additional delay caused by the transmission of frames from other queues. The term is neither a lower nor an upper bound on the actual delay, since some queues may subsequently increase or decrease their $k_j^*$ values, while others may decide to defer transmission until the next round. The next packet to arrive at queue i may actually arrive later than one scheduling round, that is, $\hat{t}_{next}>t_{current}+$ $$\sum_{j\neq 1} T_j(k_i^*),$$

forcing queue i to repeat the decision making process. If the expected arrival time of the next packet is too far in the future that it may cause a deadline violation, that is, $\hat{t}_{next}>d_i-t_{arr}(i,1)+\hat{T}_i(k_i^*+1)$, then queue i tries to avoid the unnecessary wait and proceeds to encapsulate and transmit a frame.

Whether waiting may cause excessive packet loss rate is established at step 282. Excessive packet loss rate may refer to a packet loss rate that does not satisfy a threshold value. The condition may be established according to Equation (15):

$$(M_{vio}^{(i)} + k_i^* + 1)/(M_{tot}^{(i)} + k_i^* + 1) > \varepsilon_i \quad (15)$$

Whether there is no significant efficiency improvement by waiting is established at step 284. Efficiency improvement may refer to increased efficiency as discussed previously. The condition may be established according to Equation (16):

$$\eta(s_{tot}(i,k_i^*)+s_{next})-\eta(s_{tot}(i,k_i^*))<\eta_{th} \quad (16)$$

where $\eta_{th}$ is an adjustable efficiency threshold.

Even if the arrival time and the size of the next packet are accurately predicted and the frame encapsulation at subsequent queues is performed as anticipated from current number $k_j^*$ of packet values, there is no guarantee that the deadline of the head-of-line packet can be met. The deadline may be violated due to collisions and back-off delays, which cannot be anticipated by a station 20. Accordingly, if delaying frame encapsulation and transmission is expected to lead to a deadline violation, station 20 should not defer frame encapsulation unless station 20 has leeway to tolerate packet violation, and loss in the expected bandwidth gain resulting from deferring the encapsulation is sufficient.

If less than two conditions are satisfied at step 286, the method proceeds to step 288, where the flag is set to false. After setting the flag to false the method terminates. If at least two conditions are satisfied at step 286, the method proceeds to step 290, where the flag is set to true. After setting the flag to true, the method terminates.

Other suitable procedures for setting the flags may be used. For example, procedures that rely on the prediction of the channel status at the time the next packet arrives may also be used. For example, station 20 may track the fraction of time the channel has been idle. The fraction may be computed over a moving window to account for the dynamics of the traffic. In the case of number $k_i^*$ of packets to be encapsulated equals the number $Q_i$ of packets at queue i, the decision of whether to encapsulate may be made depending the conditions established at steps 280 through 284 as well as the fraction of idle time. For example, if none of the conditions are satisfied and the probability of an idle channel is less than a certain percentage such as 50%, station 20 may decide to wait in hopes that the time the next packet arrives, the channel may be more likely to be available.

Modifications, additions, or omissions may be made to the method without departing from the scope of the invention. Additionally, steps may be performed in any suitable order without departing from the scope of the invention.

Figure 7:
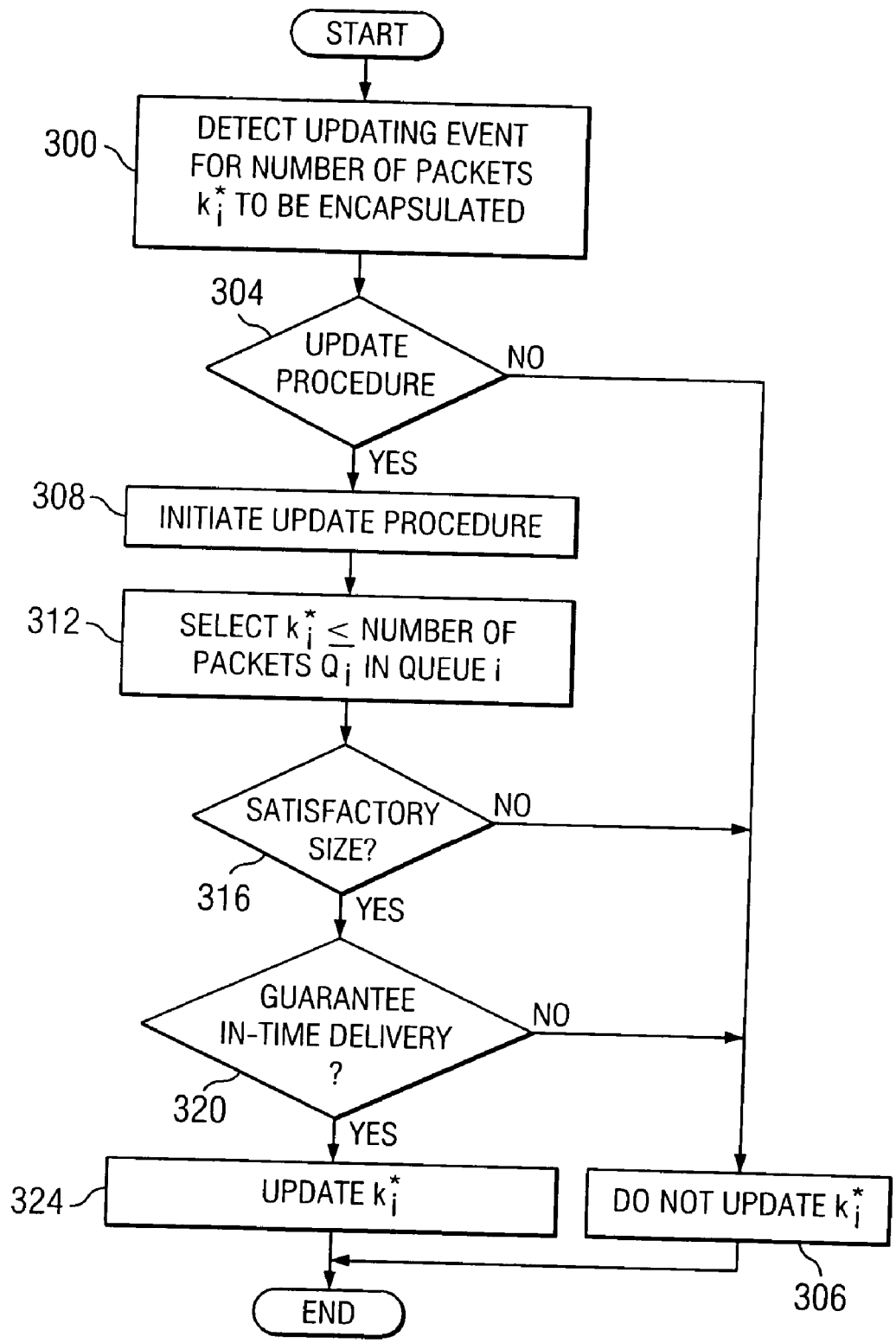
FIG. 7 is a flowchart illustrating one embodiment of a method for updating a number of packets to be encapsulated into a frame at a real-time queue.

FIG. 7 is a flowchart illustrating one embodiment of a method for updating a number $k_i^*$ of packets to be encapsulated into a frame at a real-time queue i. The method begins at step 300, where an updating event is detected. An updating event may comprise, for example, successfully transmitting a frame from queue i, receiving a new packet at queue i, determining that a frame payload timer (FPT) of queue i has expired, or other suitable event.

Control logic 32 determines whether to perform an updating procedure for the number $k_i^*$ of packets at step 304. For example, in the case of the receiving the next packet, there are two possibilities. If the previous value of the number $k_i^*$ of packets was less than the number $Q_i$ of packets at queue i, then the value for the $k_i^*$ does not need to be updated since the frame cannot accommodate packets already at queue i. If number $k_i^*$ of packets is equal to $Q_i$, then the updating procedure may be performed in order to determine whether the frame can accommodate a new packet.

If an update procedure is not to be performed, the method proceeds to step 306, where the number $k_i^*$ is not updated. After not updating, the method terminates. If an update procedure is to be performed at step 304, the method proceeds to step 308 to initiate the update procedure. A value for the number $k_i^*$ of packets less than the number $Q_i$ of packets is selected at step 312. Control logic 32a determines at step 316 whether the selected value of $k_i^*$ results in a frame of a satisfactory size, which may be determined by establishing whether the selected value of $k_i^*$ satisfies $s_{tot}(i, k_i^*) \leq s_{max}$.

If the selected value of $k_i^*$ does not yield a satisfactory size at step 316, the method proceeds to step 306, where the number $k_i^*$ of packets is not updated. After not updating the value, the method terminates. If the selected value of $k_i^*$ yields a satisfactory size, the method proceeds to step 320, where control logic 32a determines whether the selected value of $k_i^*$ guarantees in-time delivery for the head-of-line packet, while the next packet in a frame will lead to a deadline violation. This condition may be established using the following relation $\delta_i(1, k_i^*) \leq d_i < \delta_i(1, k_i^*+1)$.

If the selected value of $k_i^*$ cannot guarantee in-time delivery, the method proceeds to step 306, where the number $k_i^*$ of packets is not updated. After not updating the value, the method terminates. If the selected value can guarantee the in-timed delivery, the method proceeds to step 324, where the number $k_i^*$ of packets is updated. After updating the value, the method terminates.

Modifications, additions, or omissions may be made to the method without departing from the scope of the invention. Additionally, steps may be performed in any suitable order without departing from the scope of the invention.

Certain embodiments of the invention may provide one or more technical advantages. A technical advantage of one embodiment may be that the number of packets encapsulated into a frame at a queue of a network may be adaptively adjusted according to changes in packet deadlines at the queue and in network conditions. Adaptive encapsulation may minimize bandwidth overhead caused by encapsulation. Another technical advantage of one embodiment may be that adaptive encapsulation may provide for a reduced number of transmission attempts, which may lead to improved throughput performance.

Although an embodiment of the invention and its advantages are described in detail, a person skilled in the art could make various alterations, additions, and omissions without departing from the spirit and scope of the present invention as defined by the appended claims.

What is claimed is:

1. A method for encapsulating a plurality of packets into a frame, comprising:
   receiving a plurality of packets at a station of a plurality of stations of a network, each packet associated with a delay requirement, the delay requirement reflecting a deadline corresponding to at least a subset of the plurality of stations;
   directing the plurality of packets to a plurality of queues of the station;
   detecting an available channel of the network;
   selecting a queue of the plurality of queues by:
      determining that the queue transmitted a colliding frame involved in a collision; and
      selecting the queue in response to the determination;
   determining that one or more packets at the selected queue are ready to be encapsulated into a frame in accordance with the delay requirements associated with the one or more packets; and
   encapsulating the one or more packets into the frame for transmission using the available channel.

2. A method for encapsulating a plurality of packets into a frame, comprising:
   receiving a plurality of packets at a station of a plurality of stations of a network, each packet associated with a delay requirement, the delay requirement reflecting a deadline corresponding to at least a subset of the plurality of stations;
   directing the plurality of packets to a plurality of queues of the station;
   detecting an available channel of the network;
   determining that one or more packets at a queue of the plurality of queues are ready to be encapsulated into a frame in accordance with the delay requirements associated with the one or more packets by:
      receiving at the queue a current packet having a current packet size, the queue having one or more potential packets having a collective packet size, the one or more potential packets to be potentially encapsulated;

determining whether a sum of the current packet size and the collective packet size is greater than a maximum size corresponding to a payload of the frame; and determining that the queue has the one or more packets ready to be encapsulated into the frame if the sum is greater than the maximum packet size; and encapsulating the one or more packets into the frame for transmission using the available channel.

3. A method for encapsulating a plurality of packets into a frame, comprising:

receiving a plurality of packets at a station of a plurality of stations of a network, each packet associated with a delay requirement, the delay requirement reflecting a deadline corresponding to at least a subset of the plurality of stations;

directing the plurality of packets to a plurality of queues of the station;

detecting an available channel of the network;

determining that one or more packets at a queue of the plurality of queues are ready to be encapsulated into a frame in accordance with the delay requirements associated with the one or more packets by:

establishing that the queue has transmitted a previous frame, the queue having one or more remaining potential packets having a remaining collective packet size corresponding to a payload of the frame, the one or more remaining potential packets to be potentially encapsulated;

determining whether the remaining collective packet size is greater than a maximum packet size; and determining that the queue has the one or more packets ready to be encapsulated into the frame if the remaining collective packet size is greater than the maximum packet size; and encapsulating the one or more packets into the frame for transmission using the available channel.

4. A method for encapsulating a plurality of packets into a frame, comprising:

receiving a plurality of packets at a station of a plurality of stations of a network, each packet associated with a delay requirement, the delay requirement reflecting a deadline corresponding to at least a subset of the plurality of stations;

directing the plurality of packets to a plurality of queues of the station;

detecting an available channel of the network;

determining that one or more packets at a queue of the plurality of queues are ready to be encapsulated into a frame in accordance with the delay requirements associated with the one or more packets by:

predicting a next size of a next packet for the queue;

deciding that waiting for the next packet is associated with an expiration of a deadline; and determining that the queue has the one or more packets ready to be encapsulated into the frame in accordance with the decision; and encapsulating the one or more packets into the frame for transmission using the available channel.

5. A method for encapsulating a plurality of packets into a frame, comprising:

receiving a plurality of packets at a station of a plurality of stations of a network, each packet associated with a delay requirement, the delay requirement reflecting a deadline corresponding to at least a subset of the plurality of stations;

directing the plurality of packets to a plurality of queues of the station;

detecting an available channel of the network;

determining that one or more packets at a queue of the plurality of queues are ready to be encapsulated into a frame in accordance with the delay requirements associated with the one or more packets by:

predicting a next size of a next packet for the queue;

deciding that waiting for the next packet is associated with a packet loss rate that does not satisfy a threshold; and determining that the queue has the one or more packets ready to be encapsulated into the frame in accordance with the decision; and encapsulating the one or more packets into the frame for transmission using the available channel.

6. A method for encapsulating a plurality of packets into a frame, comprising:

receiving a plurality of packets at a station of a plurality of stations of a network, each packet associated with a delay requirement, the delay requirement reflecting a deadline corresponding to at least a subset of the plurality of stations;

directing the plurality of packets to a plurality of queues of the station;

detecting an available channel of the network;

determining that one or more packets at a queue of the plurality of queues are ready to be encapsulated into a frame in accordance with the delay requirements associated with the one or more packets by:

predicting a next size of a next packet for the queue;

deciding that waiting for the next packet is not associated with an efficiency improvement; and determining that the queue has the one or more packets ready to be encapsulated into the frame in accordance with the decision; and encapsulating the one or more packets into the frame for transmission using the available channel.

7. A system for encapsulating a plurality of packets into a frame, comprising:

an input operable to receive a plurality of packets, each packet associated with a delay requirement, the delay requirement reflecting a deadline corresponding to at least a subset of a plurality of stations of a network;

a plurality of queues coupled to the input and operable to queue the plurality of packets; and a scheduler coupled to the plurality of queues and operable to:

establish that there is an available channel of the network;

select a queue of the plurality of queues by:

determining that the queue transmitted a colliding frame involved in a collision; and selecting the queue in response to the determination;

determine that one or more packets at the selected queue are ready to be encapsulated into a frame in accordance with the delay requirements associated with the one or more packets; and initiate encapsulation of the one or more packets into the frame for transmission using the available channel.

8. A system for encapsulating a plurality of packets into a frame, comprising:
- an input operable to receive a plurality of packets, each packet associated with a delay requirement, the delay requirement reflecting a deadline corresponding to at least a subset of a plurality of stations of a network;
- a plurality of queues coupled to the input and operable to queue the plurality of packets; and
- a scheduler coupled to the plurality of queues and operable to:
  - establish that there is an available channel of the network;
  - determine that one or more packets at a queue of the plurality of queues are ready to be encapsulated into a frame in accordance with the delay requirements associated with the one or more packets; and
  - initiate encapsulation of the one or more packets into the frame for transmission using the available channel;
- the queue is further operable to calculate that the one or more packets at the queue of the plurality of queues are ready to be encapsulated into the frame by:
  - receiving at the queue a current packet having a current packet size, the queue having one or more potential packets having a collective packet size, the one or more potential packets to be potentially encapsulated;
  - determining whether a sum of the current packet size and the collective packet size is greater than a maximum size corresponding to a payload of the frame; and
  - determining that the queue has the one or more packets ready to be encapsulated into the frame if the sum is greater than the maximum packet size.

9. A system for encapsulating a plurality of packets into a frame, comprising:
- an input operable to receive a plurality of packets, each packet associated with a delay requirement, the delay requirement reflecting a deadline corresponding to at least a subset of a plurality of stations of a network;
- a plurality of queues coupled to the input and operable to queue the plurality of packets; and
- a scheduler coupled to the plurality of queues and operable to:
  - establish that there is an available channel of the network;
  - determine that one or more packets at a queue of the plurality of queues are ready to be encapsulated into a frame in accordance with the delay requirements associated with the one or more packets; and
  - initiate encapsulation of the one or more packets into the frame for transmission using the available channel;
- the queue is further operable to calculate that the one or more packets at the queue of the plurality of queues are ready to be encapsulated into the frame by:
  - establishing that the queue has transmitted a previous frame, the queue having one or more remaining potential packets having a remaining collective packet size corresponding to a payload of the frame, the one or more remaining potential packets to be potentially encapsulated;
  - determining whether the remaining collective packet size is greater than a maximum packet size; and
  - determining that the queue has the one or more packets ready to be encapsulated into the frame if the remaining collective packet size is greater than the maximum packet size.

10. A system for encapsulating a plurality of packets into a frame, comprising:
- an input operable to receive a plurality of packets, each packet associated with a delay requirement, the delay requirement reflecting a deadline corresponding to at least a subset of a plurality of stations of a network;
- a plurality of queues coupled to the input and operable to queue the plurality of packets; and
- a scheduler coupled to the plurality of queues and operable to:
  - establish that there is an available channel of the network;
  - determine that one or more packets at a queue of the plurality of queues are ready to be encapsulated into a frame in accordance with the delay requirements associated with the one or more packets; and
  - initiate encapsulation of the one or more packets into the frame for transmission using the available channel;
- the queue is further operable to calculate that the one or more packets at the queue of the plurality of queues are ready to be encapsulated into the frame by:
  - predicting a next size of a next packet for the queue;
  - deciding that waiting for the next packet is associated with an expiration of a deadline; and
  - determining that the queue has the one or more packets ready to be encapsulated into the frame in accordance with the decision.

11. A system for encapsulating a plurality of packets into a frame, comprising:
- an input operable to receive a plurality of packets, each packet associated with a delay requirement, the delay requirement reflecting a deadline corresponding to at least a subset of a plurality of stations of a network;
- a plurality of queues coupled to the input and operable to queue the plurality of packets; and
- a scheduler coupled to the plurality of queues and operable to:
  - establish that there is an available channel of the network;
  - determine that one or more packets at a queue of the plurality of queues are ready to be encapsulated into a frame in accordance with the delay requirements associated with the one or more packets; and
  - initiate encapsulation of the one or more packets into the frame for transmission using the available channel;
- the queue is further operable to calculate that the one or more packets at the queue of the plurality of queues are ready to be encapsulated into the frame by:
  - predicting a next size of a next packet for the queue;
  - deciding that waiting for the next packet is associated with a packet loss rate that does not satisfy a threshold; and
  - determining that the queue has the one or more packets ready to be encapsulated into the frame in accordance with the decision.

12. A system for encapsulating a plurality of packets into a frame, comprising:
- an input operable to receive a plurality of packets, each packet associated with a delay requirement, the delay requirement reflecting a deadline corresponding to at least a subset of a plurality of stations of a network;

a plurality of queues coupled to the input and operable to queue the plurality of packets; and a scheduler coupled to the plurality of queues and operable to:

establish that there is an available channel of the network;

determine that one or more packets at a queue of the plurality of queues are ready to be encapsulated into a frame in accordance with the delay requirements associated with the one or more packets; and initiate encapsulation of the one or more packets into the frame for transmission using the available channel;

the queue is further operable to calculate that the one or more packets at the queue of the plurality of queues are ready to be encapsulated into the frame by:

predicting a next size of a next packet for the queue;

deciding that waiting for the next packet is not associated with an efficiency improvement; and determining that the queue has the one or more packets ready to be encapsulated into the frame in accordance with the decision.

13. Logic for encapsulating a plurality of packets into a frame, the logic embodied in a computer-readable storage medium and when executed by a computer operable to:

receive a plurality of packets at a station of a plurality of stations of a network, each packet associated with a delay requirement, the delay requirement reflecting a deadline corresponding to at least a subset of the plurality of stations;

direct the plurality of packets to a plurality of queues of the station;

detect an available channel of the network;

select a queue of the plurality of queues by:

determining that the queue transmitted a colliding frame involved in a collision; and selecting the queue in response to the determination;

determine that one or more packets at the selected queue are ready to be encapsulated into a frame in accordance with the delay requirements associated with the one or more packets; and encapsulate the one or more packets into the frame for transmission using the available channel.

14. Logic for encapsulating a plurality of packets into a frame, the logic embodied in a computer-readable storage medium and when executed by a computer operable to:

receive a plurality of packets at a station of a plurality of stations of a network, each packet associated with a delay requirement, the delay requirement reflecting a deadline corresponding to at least a subset of the plurality of stations;

direct the plurality of packets to a plurality of queues of the station;

detect an available channel of the network;

determine that one or more packets at a queue of the plurality of queues are ready to be encapsulated into a frame in accordance with the delay requirements associated with the one or more packets by:

receiving at the queue a current packet having a current packet size, the queue having one or more potential packets having a collective packet size, the one or more potential packets to be potentially encapsulated;

determining whether a sum of the current packet size and the collective packet size is greater than a maximum size corresponding to a payload of the frame; and determining that the queue has the one or more packets ready to be encapsulated into the frame if the sum is greater than the maximum packet size; and encapsulate the one or more packets into the frame for transmission using the available channel.

15. Logic for encapsulating a plurality of packets into a frame, the logic embodied in a computer-readable storage medium and when executed by a computer operable to:

receive a plurality of packets at a station of a plurality of stations of a network, each packet associated with a delay requirement, the delay requirement reflecting a deadline corresponding to at least a subset of the plurality of stations;

direct the plurality of packets to a plurality of queues of the station;

detect an available channel of the network;

determine that one or more packets at a queue of the plurality of queues are ready to be encapsulated into a frame in accordance with the delay requirements associated with the one or more packets by:

establishing that the queue has transmitted a previous frame, the queue having one or more remaining potential packets having a remaining collective packet size corresponding to a payload of the frame, the one or more remaining potential packets to be potentially encapsulated;

determining whether the remaining collective packet size is greater than a maximum packet size; and determining that the queue has the one or more packets ready to be encapsulated into the frame if the remaining collective packet size is greater than the maximum packet size; and encapsulate the one or more packets into the frame for transmission using the available channel.

16. Logic for encapsulating a plurality of packets into a frame, the logic embodied in a computer-readable storage medium and when executed by a computer operable to:

receive a plurality of packets at a station of a plurality of stations of a network, each packet associated with a delay requirement, the delay requirement reflecting a deadline corresponding to at least a subset of the plurality of stations;

direct the plurality of packets to a plurality of queues of the station;

detect an available channel of the network;

determine that one or more packets at a queue of the plurality of queues are ready to be encapsulated into a frame in accordance with the delay requirements associated with the one or more packets by:

predicting a next size of a next packet for the queue;

deciding that waiting for the next packet is associated with an expiration of a deadline; and determining that the queue has the one or more packets ready to be encapsulated into the frame in accordance with the decision; and encapsulate the one or more packets into the frame for transmission using the available channel.

17. Logic for encapsulating a plurality of packets into a frame, the logic embodied in a computer-readable storage medium and when executed by a computer operable to:

receive a plurality of packets at a station of a plurality of stations of a network, each packet associated with a delay requirement, the delay requirement reflecting a deadline corresponding to at least a subset of the plurality of stations;

direct the plurality of packets to a plurality of queues of the station;

detect an available channel of the network;
determine that one or more packets at a queue of the plurality of queues are ready to be encapsulated into a frame in accordance with the delay requirements associated with the one or more packets by:
  predicting a next size of a next packet for the queue;
  deciding that waiting for the next packet is associated with a packet loss rate that does not satisfy a threshold; and
  determining that the queue has the one or more packets ready to be encapsulated into the frame in accordance with the decision; and
encapsulate the one or more packets into the frame for transmission using the available channel.

18. Logic for encapsulating a plurality of packets into a frame, the logic embodied in a computer-readable storage medium and when executed by a computer operable to:
receive a plurality of packets at a station of a plurality of stations of a network, each packet associated with a delay requirement, the delay requirement reflecting a deadline corresponding to at least a subset of the plurality of stations;
direct the plurality of packets to a plurality of queues of the station;
detect an available channel of the network;
determine that one or more packets at a queue of the plurality of queues are ready to be encapsulated into a frame in accordance with the delay requirements associated with the one or more packets by:
  predicting a next size of a next packet for the queue;
  deciding that waiting for the next packet is not associated with an efficiency improvement; and
  determining that the queue has the one or more packets ready to be encapsulated into the frame in accordance with the decision; and
encapsulate the one or more packets into the frame for transmission using the available channel.

19. A system for encapsulating a plurality of packets into a frame, comprising:
means for receiving a plurality of packets at a station of a plurality of stations of a network, each packet associated with a delay requirement, the delay requirement reflecting a deadline corresponding to at least a subset of the plurality of stations;
means for directing the plurality of packets to a plurality of queues of the station;
means for detecting an available channel of the network;
means for selecting a queue of the plurality of queues by:
  determining that the queue transmitted a colliding frame involved in a collision; and
  selecting the queue in response to the determination;
means for determining that one or more packets at the queue of the plurality of queues are ready to be encapsulated into a frame in accordance with the delay requirements associated with the one or more packets; and
means for encapsulating the one or more packets into the frame for transmission using the available channel.

20. A method for encapsulating a plurality of packets into a frame, comprising:
receiving a plurality of packets at a station of a plurality of stations of a network, each packet associated with a delay requirement, the delay requirement reflecting a deadline corresponding to at least a subset of the plurality of stations;
directing the plurality of packets to a plurality of queues of the station;
detecting an available channel of the network;
selecting a queue of the plurality of queues by determining that the queue transmitted a colliding frame involved in a collision and selecting the queue in response to the determination, and by selecting the queue of the plurality of queues according to a selection procedure;
determining that one or more packets at the queue of the plurality of queues are ready to be encapsulated into a frame in accordance with the delay requirements associated with the one or more packets by:
  receiving at the queue a current packet having a current packet size, the queue having one or more potential packets having a collective packet size, the one or more potential packets to be potentially encapsulated, determining whether a sum of the current packet size and the collective packet size is greater than a maximum size corresponding to a payload of the frame, and determining that the queue has the one or more packets ready to be encapsulated into the frame if the sum is greater than the maximum packet size;
  establishing that the queue has transmitted a previous frame, the queue having one or more remaining potential packets having a remaining collective packet size, the one or more remaining potential packets to be potentially encapsulated, determining whether the remaining collective packet size is greater than a maximum packet size, and determining that the queue has the one or more packets ready to be encapsulated into the frame if the remaining collective packet size is greater than the maximum packet size;
  predicting a first next size of a first next packet for the queue, deciding that waiting for the first next packet is associated with an expiration of a deadline, and determining that the queue has the one or more packets ready to be encapsulated into the frame in accordance with the decision;
  predicting a second next size of a second next packet for the queue, deciding that waiting for the second next packet is associated with a packet loss rate that does not satisfy a threshold, and determining that the queue has the one or more packets ready to be encapsulated into the frame in accordance with the decision; and
  predicting a third next size of a third next packet for the queue, deciding that waiting for the third next packet is not associated with an efficiency improvement, and determining that the queue has the one or more packets ready to be encapsulated into the frame in accordance with the decision; and
encapsulating the one or more packets into the frame for transmission using the available channel.

* * * * *

UNITED STATES PATENT AND TRADEMARK OFFICE
CERTIFICATE OF CORRECTION

PATENT NO. : 7,324,522 B2
APPLICATION NO. : 10/666812
DATED : January 29, 2008
INVENTOR(S) : Phillip I. Rosengard et al.

It is certified that error appears in the above-identified patent and that said Letters Patent is hereby corrected as shown below:

Column 3:
Line 25, delete "Sp" and insert -- $S_p$ --.
Line 43, delete "P1" and insert -- $P_1$ --.
Line 45, delete "P2" and insert -- $P_2$ --.

Column 5:
Line 60, delete after "≡ Σ" delete "$j = 1^k$"
and insert -- $\sum_{j=1}^{k}$ --.

Column 11:
Line 67, after " $k_j^*$ " insert -- + --.

Column 12:
Line 10, after "$t_{current}$ +" delete " $\sum_{j \ne 1}$ "
and insert -- $+\sum_{j \ne 1}$ --.

Line 20, delete " $\sum_{j \ne 1}$ "
and insert -- $+\sum_{j \ne 1}$ --.

UNITED STATES PATENT AND TRADEMARK OFFICE
CERTIFICATE OF CORRECTION

PATENT NO. : 7,324,522 B2
APPLICATION NO. : 10/666812
DATED : January 29, 2008
INVENTOR(S) : Phillip I. Rosengard et al.

It is certified that error appears in the above-identified patent and that said Letters Patent is hereby corrected as shown below:

Line 33, delete " $\sum_{j=1}$ "

and insert -- $+\sum_{j \neq 1}$ --.

Signed and Sealed this

Twenty-sixth Day of May, 2009

JOHN DOLL
*Acting Director of the United States Patent and Trademark Office*